United States Patent [19]
Toida et al.

[11] Patent Number: 5,335,809
[45] Date of Patent: Aug. 9, 1994

[54] HEAT INSULATING CONTAINER

[75] Inventors: Shoji Toida; Seiichi Ito; Hidetoshi Ohta; Isao Ishikawa, all of Tokyo, Japan

[73] Assignee: Nippon Sanso Kabushiki Kaisha, Tokyo, Japan

[21] Appl. No.: 187,261

[22] Filed: Jan. 27, 1994

Related U.S. Application Data

[63] Continuation of Ser. No. 994,045, Dec. 15, 1992, abandoned, which is a continuation of Ser. No. 623,428, Jan. 31, 1991, abandoned.

[30] Foreign Application Priority Data

Apr. 20, 1989 [JP] Japan .............. 1-46398[U]
Apr. 21, 1989 [JP] Japan .............. 1-47577[U]

[51] Int. Cl.$^5$ ............................ B65D 81/38
[52] U.S. Cl. .................... 220/425; 220/420; 220/739; 220/903; 220/375
[58] Field of Search .............. 215/12.1, 235, 236, 215/306; 220/412, 413, 425, 420, 737, 739, 740, 903, 336, 337, 338, 254, 329, 375, 93, 291, 343; 248/311.2

[56] References Cited

U.S. PATENT DOCUMENTS

| | | | |
|---|---|---|---|
| 882,547 | 3/1908 | Chellis | 215/236 |
| 989,658 | 4/1911 | Steel | 220/425 |
| 990,077 | 4/1911 | Steel | 220/425 |
| 1,324,869 | 12/1919 | Wolfermann | 215/235 |
| 2,015,761 | 10/1935 | Muro | 220/291 |
| 2,600,021 | 6/1952 | Pritchard | 220/291 |
| 3,263,806 | 8/1966 | Ring | 220/93 |
| 3,355,045 | 11/1967 | Douglas | 220/425 |
| 3,472,568 | 10/1969 | Southwick | 220/412 |
| 3,848,766 | 11/1974 | Ganti et al. | 220/412 |
| 3,950,055 | 4/1976 | Samuels et al. | 220/291 |
| 4,071,163 | 1/1978 | Martin | 220/737 |
| 4,339,056 | 7/1982 | Berkstresser, Jr. et al. | 220/375 |
| 4,516,409 | 5/1985 | Hobbs, Jr. et al. | 220/93 |
| 4,705,190 | 11/1987 | Mizusawa | 220/375 |
| 4,721,216 | 1/1988 | Kinder | 220/903 |
| 4,921,120 | 5/1990 | Mizioch | 220/336 |
| 5,040,691 | 8/1991 | Hayes et al. | 215/235 |

FOREIGN PATENT DOCUMENTS 60-826 1/1985 Japan .
61-5767 1/1986 Japan .
62-146709 9/1987 Japan .

*Primary Examiner*—S. Castellano
*Attorney, Agent, or Firm*—Armstrong, Westerman, Hattori, McCleland & Naughton

[57] ABSTRACT

A heat-insulating container comprising a cylindrical container having a heat-insulating layer disposed between a metal inner cylinder and a metal outer cylinder; a synthetic resin inner case with a wide mouth, in the straight cylindrical container; and a cap for closing the upper opening of the straight cylindrical container. The cap has a heat-insulating plug member fitted in the mouth of the inner case, with a plug member having an inner surface provided with an engagement portion for abutting the upper peripheral edge of a large-diameter container placed in inner case and a recess of a small-diameter storage container placed in the inner case, the inner case having a bottom provided with an engagement portion, which abuts the lower peripheral edge of the large-diameter storage container and a recess for receiving the lower portion of the small-diameter storage container.

3 Claims, 9 Drawing Sheets

HEAT INSULATING CONTAINER

This application is a continuation of application Ser. No. 07/994,045 filed Dec. 15, 1992 now abandoned, in turn a continuation of application Ser. No. 07/623,428 filed Jan. 31, 1991, now abandoned.

TECHNICAL FIELD

The present invention relates to a heat-insulating container which can directly retain storage containers containing goods that should desirably be kept cold or hot, for example, beverage-containing cans, such as cans of beer, juice or cola, or containers stuffed with soup, stew or salad, and can keep them cold or hot.

BACKGROUND ART

Vacuum bottles are widely used to keep various kinds of beverages hot or cold, and stainless portable vacuum bottles having excellent shock resistance recently become popular.

Vacuum bottles are limited in the types of beverages to be filled therein. For instance, since carbonic beverages, such as beer and cola, are not suitable to be directly filled in vacuum bottles, it is necessary to use an icebox when one wants to drink these carbonic beverages cold outdoor.

The heat-insulating property of the icebox is, however, considerably lower than that of vacuum bottles. In addition, due to its large size and heaviness, the icebox is inconvenient to carry around and is particularly unsuitable when there are a few containers, such as beverage cans.

It is therefore an object of the present invention to provide a heat-insulating container which has excellent heat-insulating property and rust resistance and high portability, can keep a few containers, such as beverage cans, cold or hot for a long period of time, and can receive two types of storage containers such as beverage cans with different diameters and heights without being rickety.

DISCLOSURE OF THE INVENTION

A heat-insulating container according to the present invention comprises a straight cylindrical container having a heat-insulating layer disposed between a metal inner cylinder with a bottom and a metal outer cylinder with a bottom; a synthetic resin inner case with a wide mouth, adapted to be inserted in the straight cylindrical container; and a cap for closing the upper opening of the straight cylindrical container, the cap having a heat-insulating plug member to be fitted in the mouth of the inner case, the plug member having an inner surface provided with an engagement portion adapted to abut on the upper peripheral edge of a large-diameter storage container placed in the inner case and a recess where an upper portion of a small-diameter storage container placed in the inner case is fitted and/or the inner case having a bottom provided with an engagement portion to abut on the lower peripheral edge of the large-diameter storage container and a recess where the lower portion of the small-diameter storage container is fitted.

Therefore, this heat-insulating container can retain one or a plurality of the mentioned storage containers in series in the inner case, can keep a few storage containers cold or hot for a long period of time, and has excellent heat-insulating property and portability. Further, with a large-diameter and long storage container being placed in the inner case of the heat-insulating container, the upper peripheral edge of this storage container and/or the lower peripheral edge thereof abuts on the engagement portion of the plug member and/or the engagement portion of the inner case, permitting the storage container to be retained without being wobbly. When a small-diameter and high storage container is placed in the inner case, the upper portion of this storage container and/or the lower portion thereof is fitted in the recess of the plug member and/or the recess in the inner case, permitting the storage container to be held without being rickety. Accordingly, this heat-insulating container can selectively retain the aforementioned large-diameter storage container or small-diameter storage container and has a high general-purpose adaptability. Since the inner case of the heat-insulating container is made of a synthetic resin, even dew drops formed on the outer surface of the storage container would not cause rusting.

Further, according to the present invention, the cap of the heat-insulating container comprises the plug member and a ring for rotatably supporting the plug member, and is hinged movable in an axial direction of the ring to a cap mounting member provided at the upper edge of the straight cylindrical container. At the time the storage container is placed in or removed from the heat-insulating container, therefore, the cap would not interfere the action, nor would it come off the heat-insulating container, thus preventing the cap from being lost.

BRIEF DESCRIPTION OF THE DRAWINGS

FIG. 1 is a perspective view,

FIG. 2 is a front cross section of a heat-insulating container retaining a large-diameter storage container, FIG. 3 is a front cross section of a heat-insulating container retaining a small-diameter storage container, FIG. 4 is an exploded perspective showing a cap and a cap mounting member, FIG. 5 is a cross section of essential portions, illustrating how the cap is mounted, FIG. 6 is a cross section taken along the line 6—6 in FIG. 5, and FIG. 7 is a cross section illustrating the cap being open.

FIG. 8 is a perspective view, and

FIG. 9 is a partly cutaway front cross section.

BEST MODE OF CARRYING OUT THE INVENTION

Figure 1:
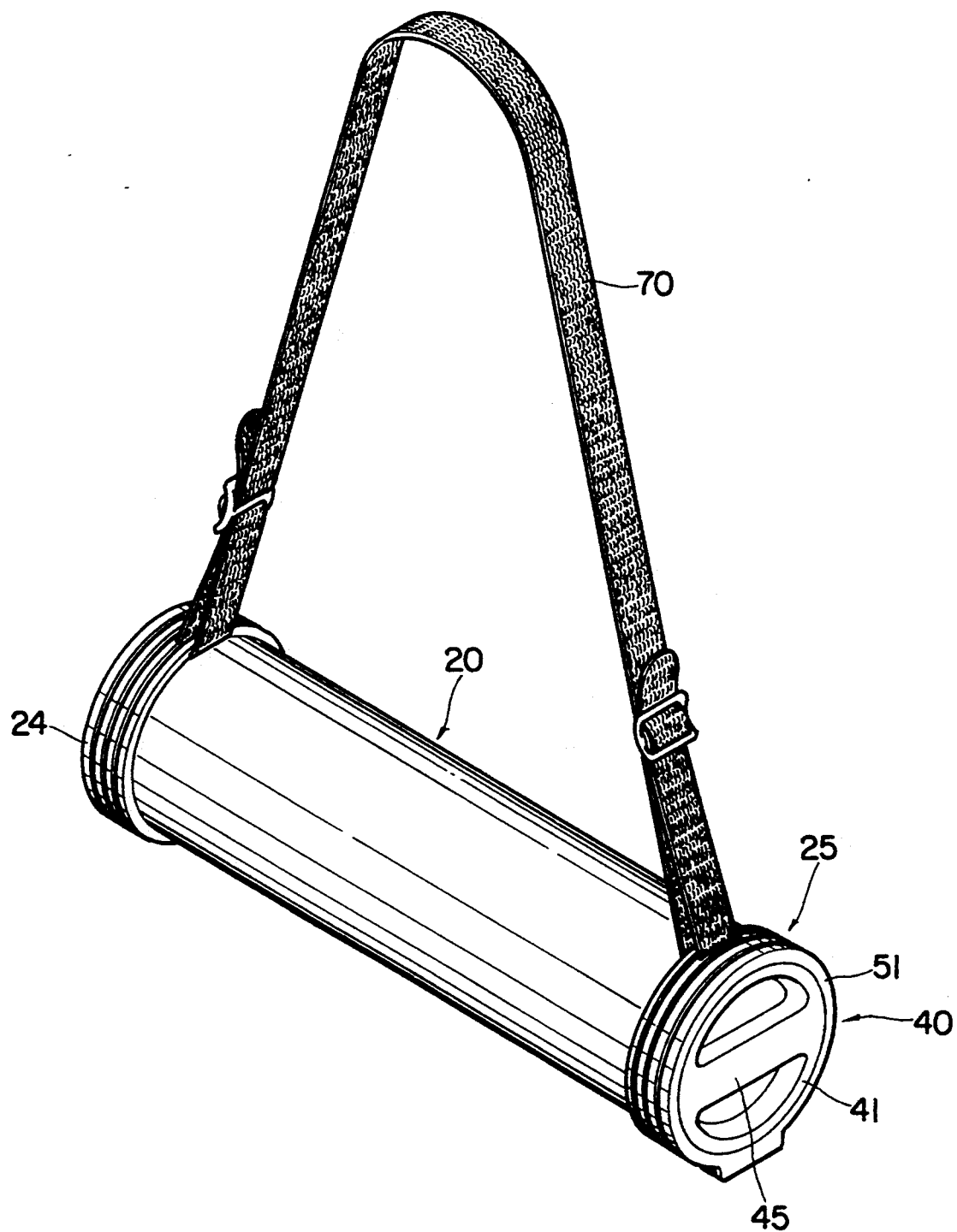
FIGS. 1 through 7 illustrate the first embodiment of the present invention.

The present invention will now be described in detail referring to the accompanying drawings.

In the following description of the embodiments, beverage cans commercially sold, such as cans of beer, juice and cola, as storage containers filled with stuff which should desirably be kept cold or hot. There are two kinds of storage containers with different diameters and heights respectively: for example, a large-diameter storage container (hereafter referred to as "large-diameter can") is a 350 ml can 66 mm in diameter and 123 mm long, and a small-diameter storage container (hereafter referred to as "small-diameter can") is a 250 ml can 53 mm in diameter and 133 mm long. These cans are made of an aluminums, coated steel sheet, or metal-plated steel sheet.

The first embodiment of the present invention will now be described referring to FIGS. 1 to 7. This embodiment relates to a heat-insulating container which can store two large-diameter cans A or two small-diameter cans B in a series.

The heat-insulating container includes a straight cylindrical container 20 with a heat-insulating layer, a synthetic resin inner case 30 with a wide mouth to be inserted into the cylindrical container 20, and a cap 40 to close the upper opening of the cylindrical container 20.

In the cylindrical container 20, an inner cylinder 22 having a bottom is fitted into an outer cylinder 23 having a bottom, with upper peripheral edges of both cylinders 22 and 23 connected airtight to form a heat-insulating vacuum layer 21 between both cylinders 22 and 23. These cylinders 22 and 23 are made of stainless steel.

A synthetic resin bottom member 24 for protection is fitted over the bottom of the cylindrical container 20. A ring-shaped, synthetic resin cap mounting member 25 is fitted around the upper peripheral edge of the straight cylindrical container 20. Support shafts 26 for hinge-connection of the cap 40 is formed in a tangential direction on the outer wall of the cap mounting member 25. Engage grooves 27 for engagement of the cap 40 are formed at three positions in the internal wall of the cap mounting member 25.

Both ends of a strap 70 are attached detachable to the bottom member 24 and the cap mounting member 25.

The internal case 30 is formed in a cylindrical shape with a bottom, and has at the bottom an engage portion 31 abuts on the lower peripheral edge of the large-diameter can A and a recess 32 where the lower portion of the small-diameter can B is fitted. The edge of the upper opening of the inner case 30 is fitted between the inner cylinder 22 and the cap mounting member 25. The outer diameter of this inner case 30 is substantially the same as the inner diameter of the inner cylinder 22, while the inner diameter of the case 30 is substantially equal to the outer diameter of the large-diameter can A.

The cap 40 comprises a heat-insulating plug member 41 to be fitted in the mouth of the inner case 30, and a ring 51 to support the plug member 41 rotatable. The plug member 41 and the ring 51 are made of a synthetic resin.

The plug member 41 has a flange 43 atop of a body 42, and a peripheral groove 44 formed around the outer wall of the flange 43. A knob 45 is formed on the top of the body 42. Protrusions 46 which engage with the engage grooves 27 are formed at three places on the outer surface of the body 42, and packing 47 is fitted thereon. Further, inside the body 42, there are an engage portion 48, which abuts on the upper peripheral edge of the large-diameter can A, and a recess 49 to receive the upper portion of the small-diameter can B. The plug member 41 has a heat-insulating layer 50 which is hollow, or filled with a heat-insulating material.

On the inner wall of the ring 51 is formed a thread 52 to engage with the peripheral groove 44; the engagement of the thread 52 with the peripheral groove 44 allows the ring 51 to support the plug member 41 rotatable. The ring 51 also includes a U-shaped link portion 54 with a groove 53, which is hinged to the support shafts 26. The groove 53 is so formed that the cap 40 is guided to the support shafts 26 to be movable in the axial direction of the ring.

Figure 4:
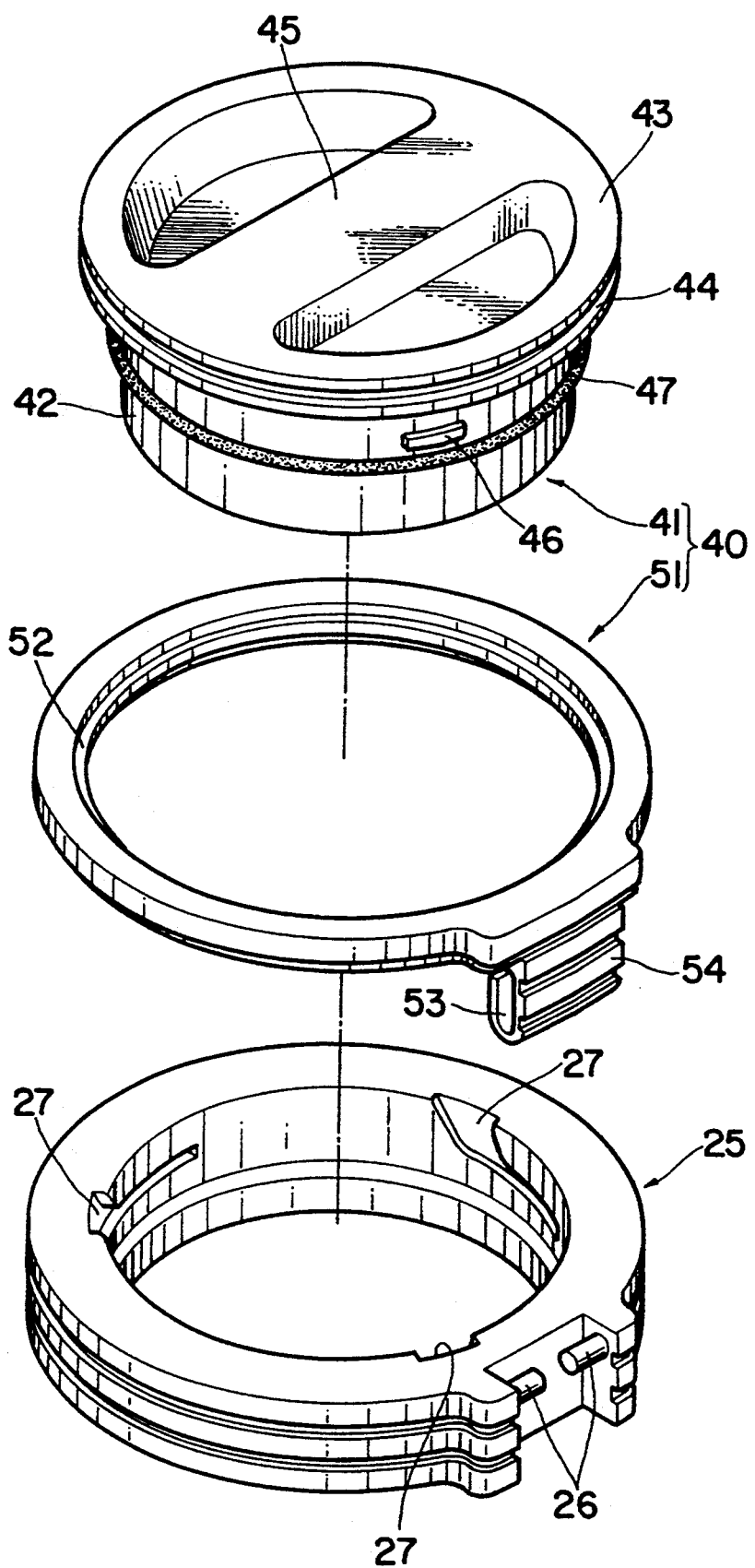
Figure 5:
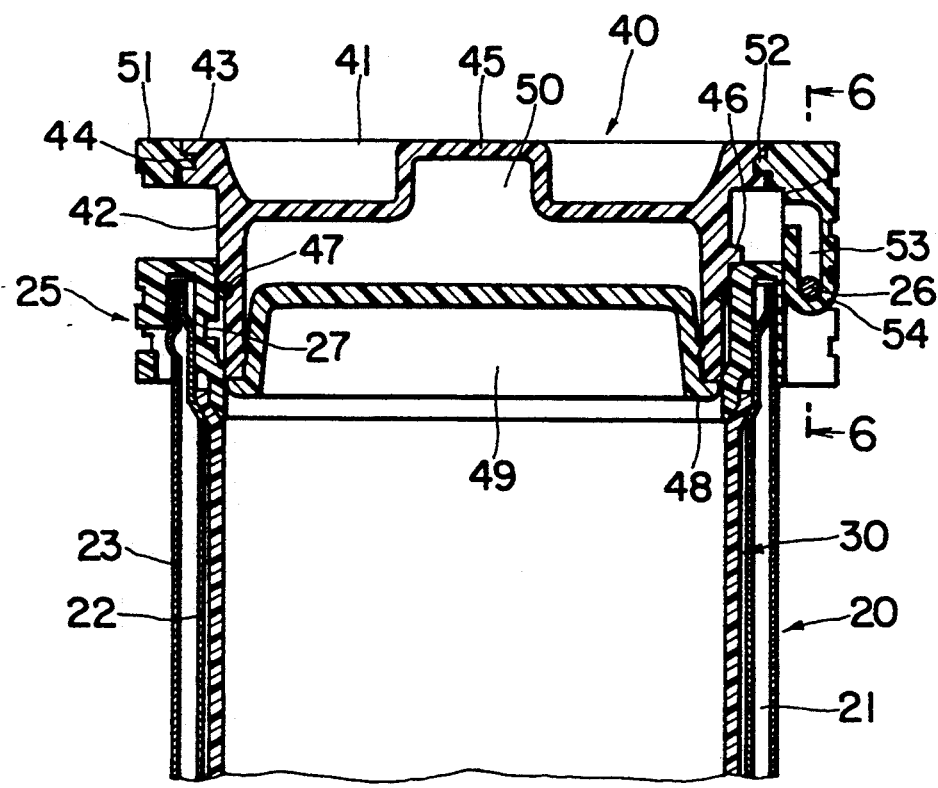
Figure 6:
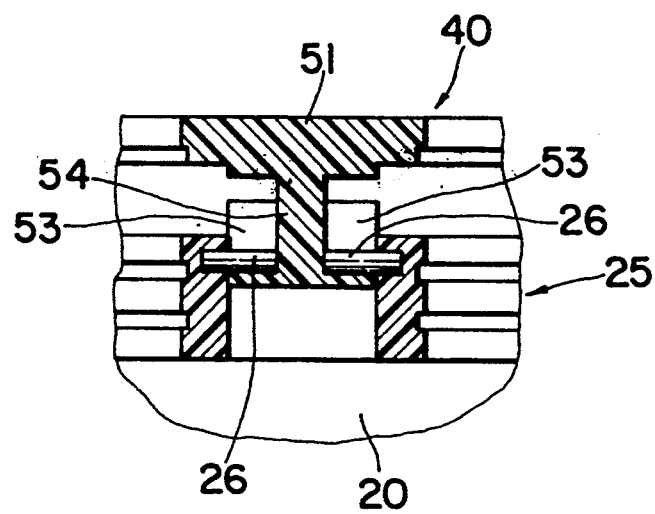
Figure 7:
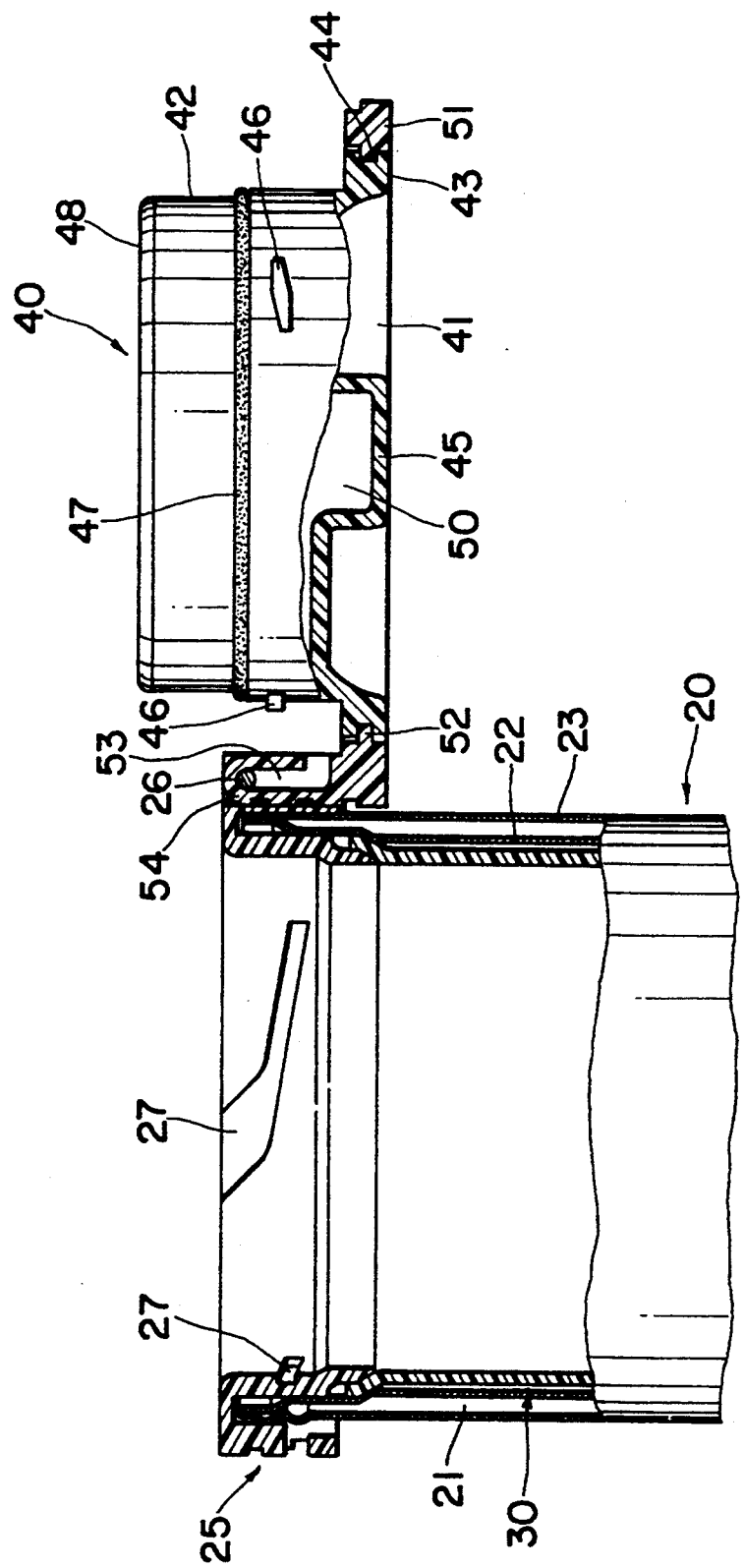

In opening the cap 40 having the above structure, the plug member 41 in FIG. 4 is turned counterclockwise holding the knob 45, the projections 46 are guided to the engage grooves 27 to raise the plug member 41 and raise the ring 51 accordingly. The cap 40 therefore rises, kept closed as shown in FIG. 5. When the cap 40 is rotated on the support shafts 26 in this state, it can be opened as shown in FIG. 7, thereby permitting the insertion and removable of cans.

To close the cap 40, the operation should be carried out in the reverse order of the above-described one.

Figure 2:
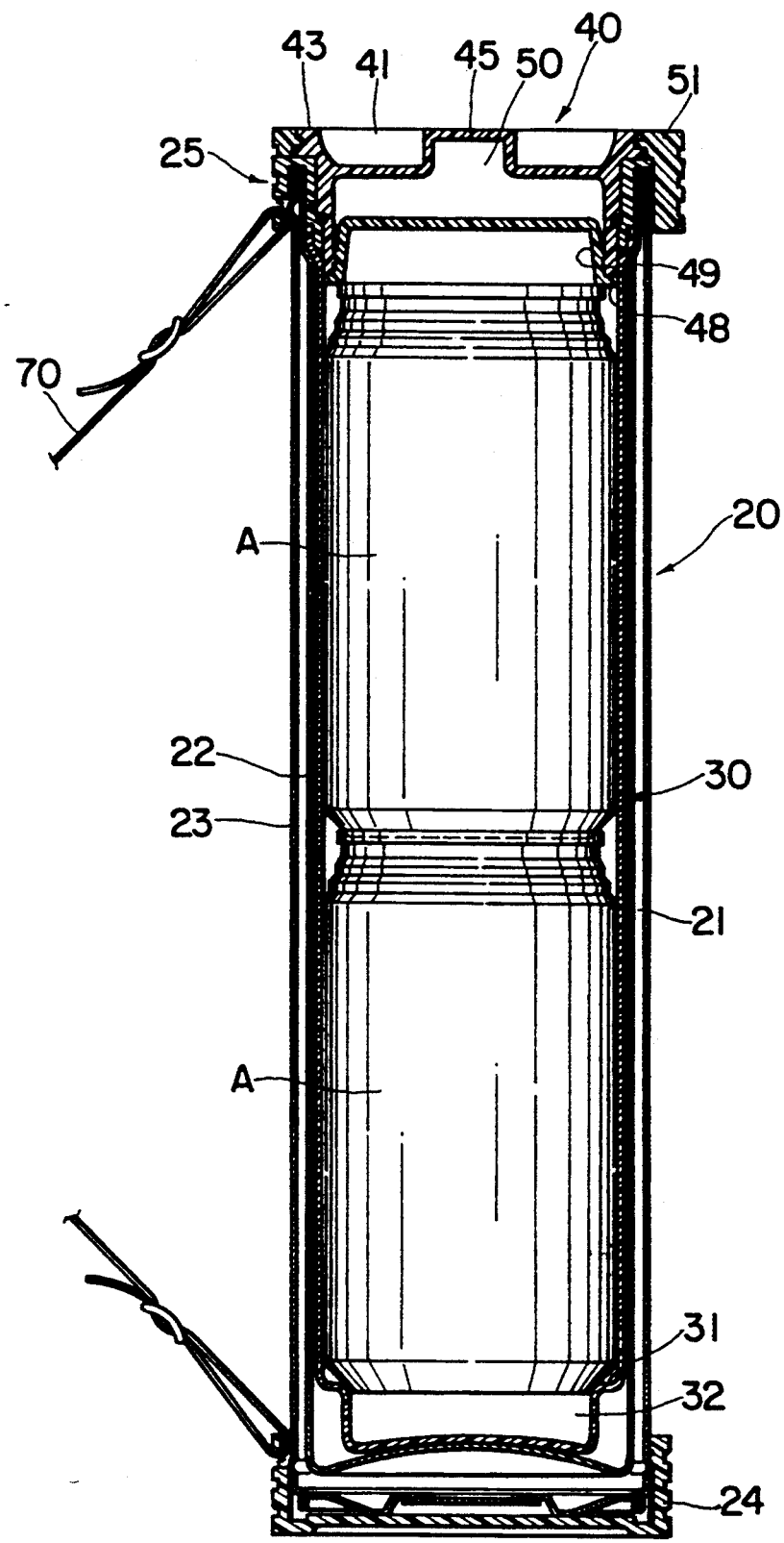

When two large-diameter cans A are placed inside the heat-insulating container, the upper peripheral edge of the upper large-diameter can A abuts on the engagement portion 48 of the cap 40 and the bottom peripheral edge of the lower large-diameter can A abuts on the engagement portion 31 of the inner case 30, as shown in FIG. 2, thereby permitting the two large-diameter cans A to be held without being wobbly. The distance between both engagement portions 48 and 31 is designed to be substantially equal to the height of the two large-diameter cans A.

Figure 3:
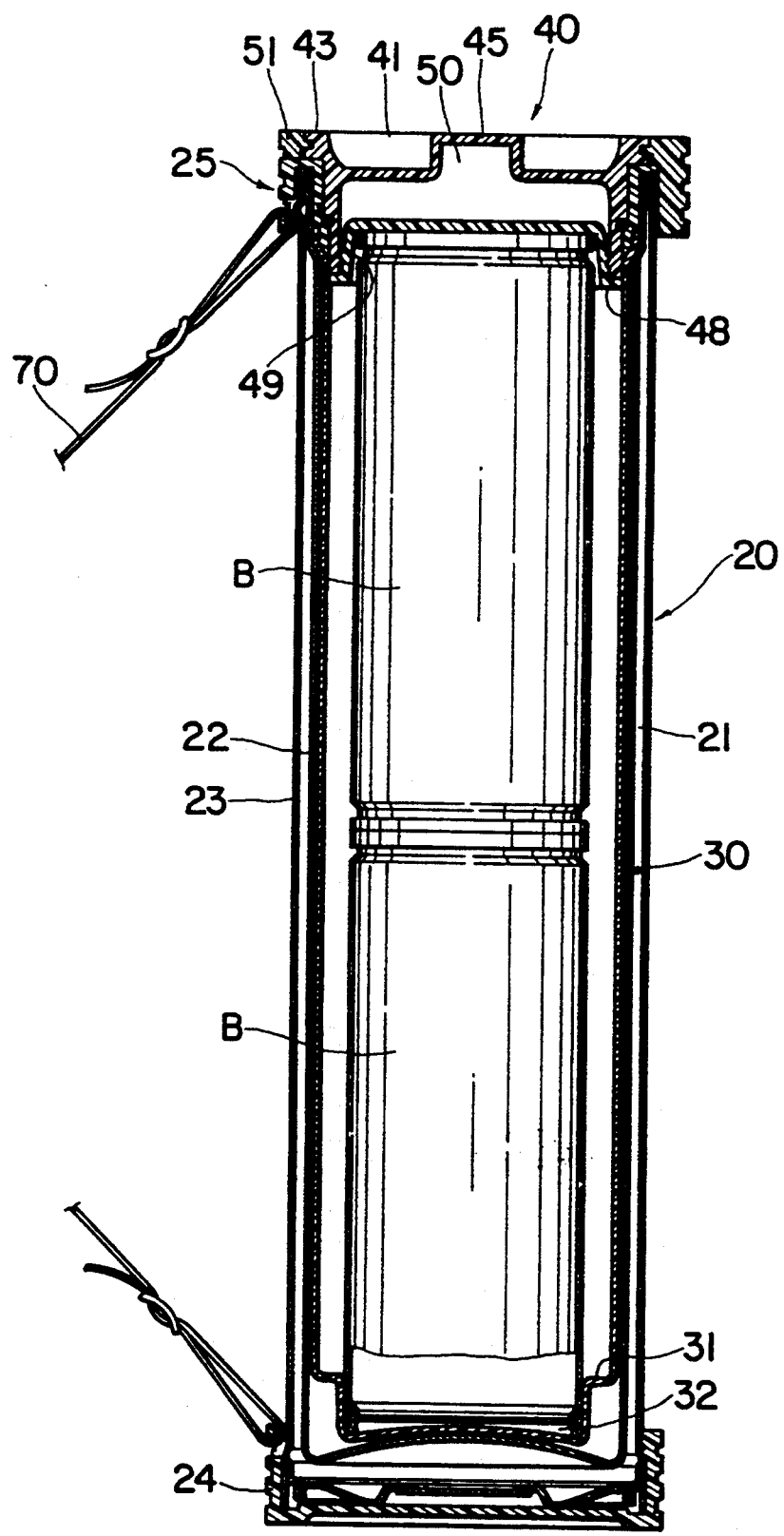

When two small-diameter cans B are placed in the heat-insulating container, the upper portion of the top small-diameter can B is fitted in the recess 49 of the cap 40, and the lower portion of the bottom small-diameter can B is fitted in the recess 32 of the inner case 30, as shown in FIG. 3, so that both small-diameter cans B can be stably held. Therefore, the distance between the bottoms of the recesses 49 and 32 is designed to be substantially the same as the height of the two small-diameter cans B, while the diameters of the recesses 49 and 32 are set substantially equal to the outer diameters of the small-diameter cans B.

There may be only one recess where the small-diameter can B is fitted in.

Figure 8:
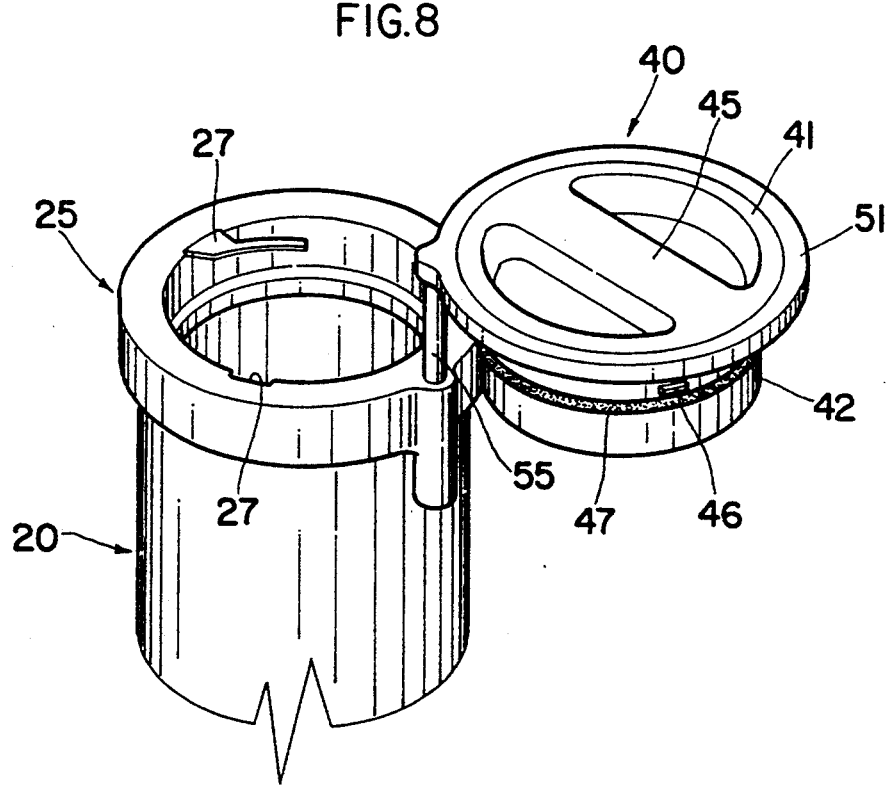
FIGS. 8 and 9 illustrate another embodiment of the cap.
Figure 9:
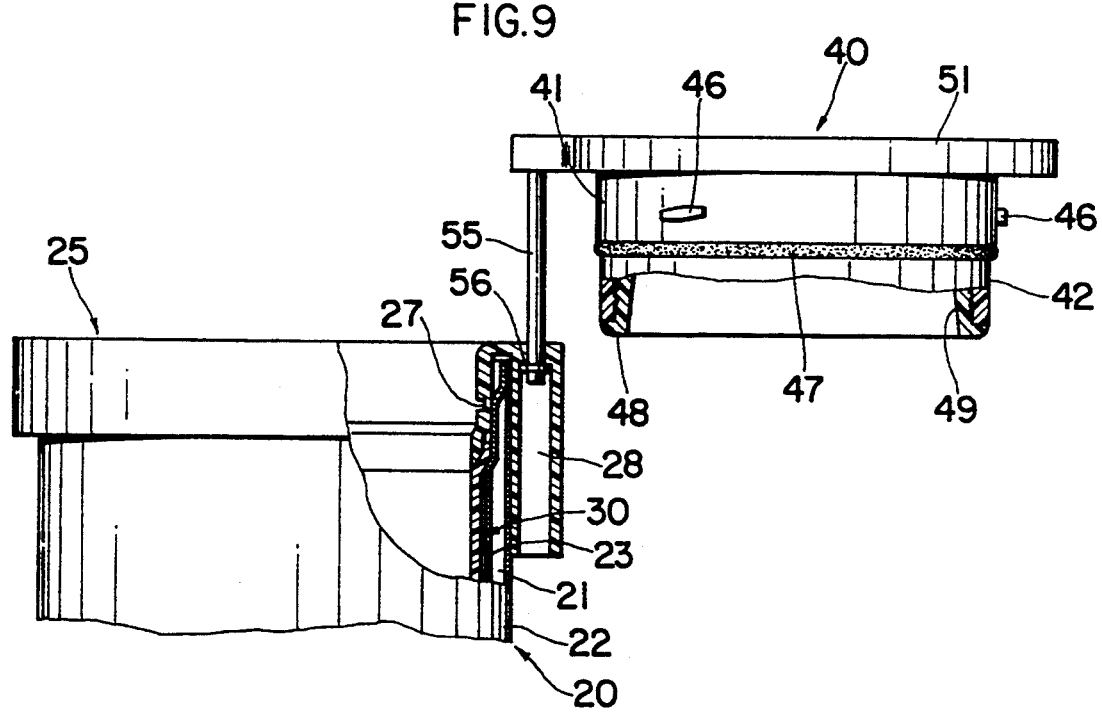

FIGS. 8 and 9 illustrate another embodiment of the cap.

The cap 40 in this embodiment, like the cap of the above-described embodiment, includes the heat-insulating plug member 41, which is to be fitted in the mouth of the inner case 30, and the ring 51 to support the plug member portion 41 rotatable. The ring 51 is provided with a support shaft 55 extending in the axial direction of the ring. At the lower end of the support shaft 55 is formed a stopper 56 to prevent the support shaft 55 from falling out.

A support-shaft through hole 28 is formed in the cap mounting member 25, extending in the axial direction thereof. With the support shaft 55 inserted in the through hole 28, the cap 40 can be moved in the axial direction of the ring in the same manner as per the above-described embodiment. The cap 40, therefore, rotates on the support shaft 55 to be opened as shown in FIGS. 8 and 9.

Figure 10:
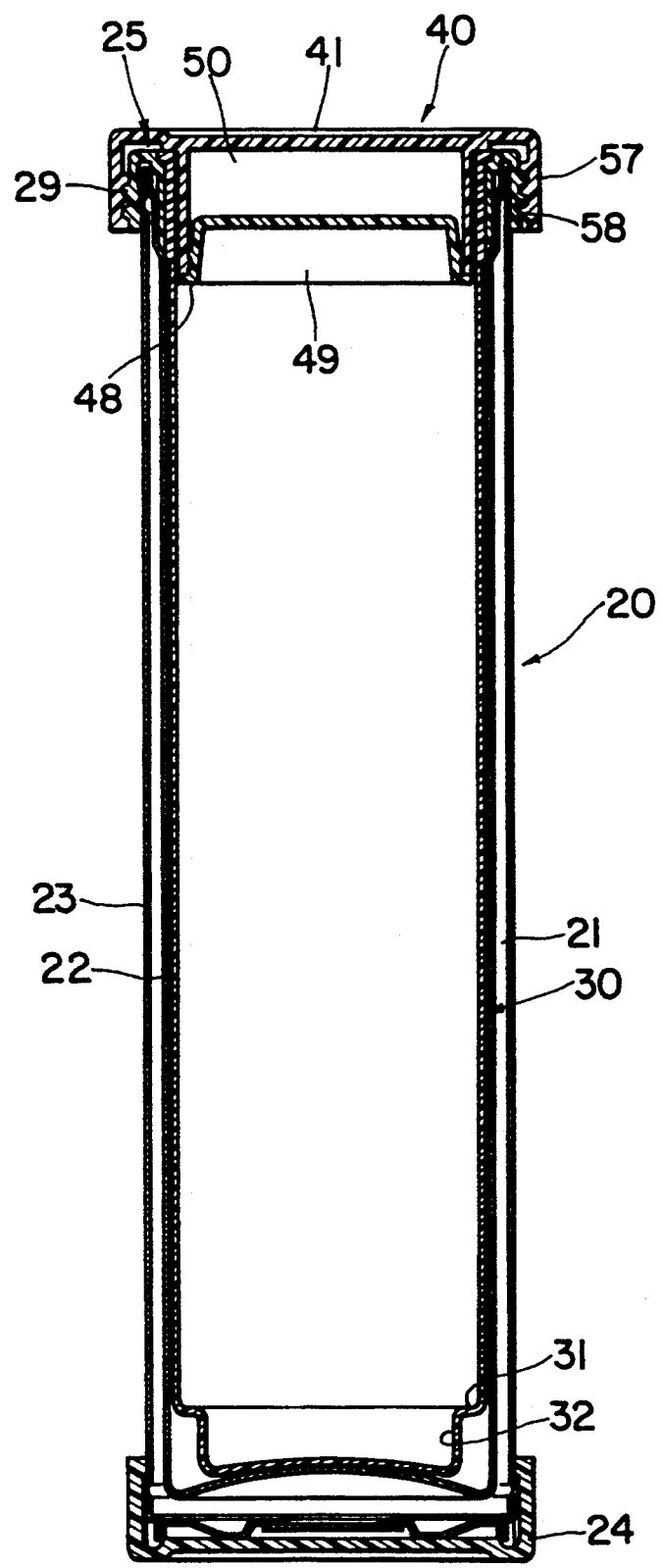
FIG. 10 is a front cross section of a heat-insulating container illustrating a further embodiment of the cap.

FIG. 10 illustrates a further embodiment of the cap.

The heat-insulating container of this embodiment has the same structure as those of the above-described embodiments, except for the cap mounting structure.

According to this embodiment, the cap 40 has a sleeve 57 formed integral with the plug member 41 which is to be fitted in the mouth of the inner case 30, with an internal thread 58 formed on the sleeve 57. The cap mounting member 25 has an external thread 29 formed to engage with the internal thread 58.

Figure 11:
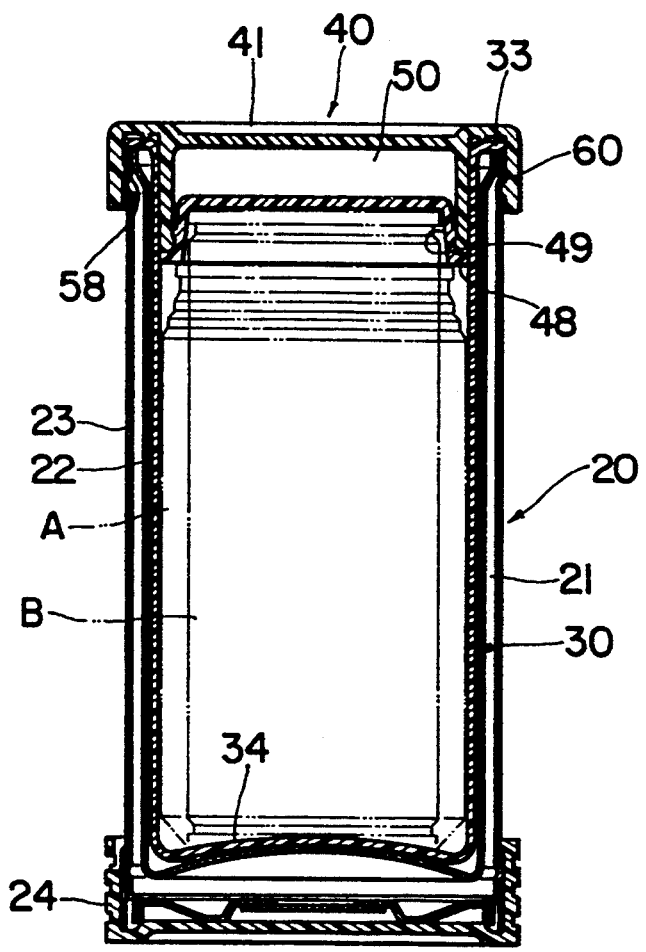
FIG. 11 is a front cross section of a heat-insulating container illustrating the second embodiment of the present invention.

FIG. 11 illustrates a heat-insulating container according to the second embodiment of the present invention.

This embodiment pertains to a heat-insulating container which can retain one large-diameter can A or one small-diameter can B.

This heat-insulating container comprises the straight cylindrical container 20 having an external thread 60 formed around the periphery of the mouth, the synthetic resin inner case 30 with a wide mouth, which is to be fitted in the container 20, and the cap 40 adapted to engage with the external thread 60 to close the upper opening of the container 20.

The straight cylindrical container 20 has the external thread 60 formed on the periphery of the mouth in place of the cap mounting men, bet of the first embodiment, and the other part designed in the same manner as that of the first embodiment.

There is nothing formed at the bottom of the inner case 30, which corresponds to the engagement portion and recess of the first embodiment. The inner case 30 has a flange 33 formed at the edge of the upper mouth, which is engaged with the mouth edge of the straight cylindrical container 20.

The cap 40 is formed in the same as the one shown in FIG. 10, with its internal thread 58 engageable with the external thread 60 of the straight cylindrical container 20.

When one large-diameter can A is placed in the heat-insulating container, the upper peripheral edge of the large-diameter can A abuts on the engagement portion 48 of the cap 40 while the bottom of the large-diameter can A abuts on the bottom wall 34 of the inner case 30, as shown in FIG. 11, thus permitting the large-diameter can A to be stably held. Accordingly, the distance between the engagement portion 48 and the bottom wall 34 is so set as to be substantially equal to the height of one large-diameter can A.

When one small-diameter can B is placed in the heat-insulating container, the upper portion of the small-diameter can B is fitted in the recess 49 of the cap 40 while the bottom of the small-diameter can B abuts on the bottom wall 34 of the inner case 30, thus permitting the small-diameter can B to be stably held. Accordingly, the distance between the bottom wall of the recess 49 and the bottom wall 34 of the inner case 30 is so set as to be substantially equal to the height of one small-diameter can B, and the diameter of the recess 49 is so set as to be substantially equal to the outer diameter of the can B.

The heat-insulating container of the present invention can retain three or more storage containers by properly setting its length.

We claim:

1. A heat-insulating container comprising:
   a straight cylindrical container having a heat-insulating vacuum layer disposed between a metal inner cylinder with a closed bottom end and a metal outer cylinder with a closed bottom end, said inner and outer cylinders being joined and sealed to each other and forming an open end of said straight cylinder container;
   a synthetic resin inner case with a bottom at one end and a wide mouth at the other end for insertion into said straight cylindrical container; and
   a cap for closing said open end of said straight cylindrical container, said cap having a heat-insulating plug member fitted into said mouth of said inner case and a ring for rotatably supporting said plug member, said plug member having an inner surface provided with an engagement portion for abutting an upper peripheral edge of a large-diameter storage container placed in said inner case when said plug member is positioned in a first axial direction in said mouth and having a recess where an upper portion of a small-diameter storage container placed in said inner case is fitted when said plug member is positioned in said first axial direction in said mouth and means on said ring member for engaging said plug member and for moving said plug member in said first axial direction, axially of said heat-insulating container and away from said mouth of said inner case, when said plug member is rotated in a first circumferential direction and for moving said plug member in a second axial direction, axially of said heat-insulating container and toward said mouth of said inner case and into engagement with said mouth, when said plug member is rotated in an opposite circumferential direction;
   said cap including a cap mounting member mounted on an upper end of said straight cylindrical container with a support shaft in a tangential direction of said cap mounting member, and a link portion on said ring for engagement with said support shaft, said link portion having a groove in which said cap is movable in an axial direction of said ring.

2. A heat-insulating container comprising:
   a straight cylindrical container having a heat-insulating vacuum layer disposed between a metal inner cylinder with a closed bottom end and a metal outer cylinder with a closed bottom end, said inner and outer cylinders being joined and sealed to each other and forming an open end of said straight sealed container;
   a synthetic resin inner case with a bottom at one end and a wide mouth at the other end and for insertion into said straight cylindrical container; and
   a cap for closing said open end of said straight cylindrical container, said cap having a heat-insulating plug member fitted into said mouth of said inner case and a ring for rotatably supporting said plug member, said bottom of said inner case having an engagement portion for abutting a lower peripheral edge of a large-diameter storage container positioned in said cylindrical container and a recess for receiving an end of a small-diameter storage container positioned in said cylindrical container and means on said ring member for engaging said plug member and for moving said plug member in a first axial direction axially of said heat-insulating container and away from said mouth of said inner case when said plug member is rotated in a first circumferential direction and for moving said plug member in a second axial direction axially of said heat-insulating container and toward said mouth of said inner case and into engagement with said mouth when said plug member is rotated in an opposite circumferential direction;
   said cap including a cap mounting member mounted on an upper end of said straight cylindrical container with a support shaft in a tangential direction of said cap mounting member, and a link portion on said ring for engagement with said support shaft, said link portion having a groove in which said cap is movable in an axial direction of said ring.

3. A heat-insulating container comprising:
- a straight cylindrical container having a heat-insulating vacuum layer disposed between a metal inner cylinder with a closed bottom end and a metal outer cylinder with a closed bottom end, said inner and outer cylinders being joined and sealed to each other and forming an open end of said straight sealed container;
- a synthetic resin inner case with a bottom at one end and a wide mouth at the other end for insertion into said straight cylinder container; and
- a cap for closing said open end of said straight cylindrical container, said cap having a heat-insulating plug member fitted into said mouth of said inner case and a ring for rotatably supporting said plug member, said plug member having an inner surface with an engagement portion for abutting an upper peripheral edge of a large-diameter storage container positioned in said inner case and a recess for abutting an upper portion of a small-diameter storage container positioned in said inner case, said inner case having a bottom portion provided with an engagement portion for abutting a lower peripheral edge of said large-diameter storage container positioned in said inner case and a recess for abutting a lower portion of said small-diameter storage container positioned in said inner case and means on said ring member for engaging said plug member and for moving said plug member in a first axial direction axially of said heat-insulating container and away from said mouth of said inner case when said plug member is rotated in a first circumferential direction and for moving said plug member in a second axial direction axially of said heat-insulating container and toward said mouth of said inner case and into engagement with said mouth when said plug member is rotated in an opposite circumferential direction;
- said cap including a cap mounting member mounted on an upper end of said straight cylindrical container with a support shaft in a tangential direction of said cap mounting member, and a link portion on said ring for engagement with said support shaft, said link portion having a groove in which said cap is movable in an axial direction of said ring.

* * * * *